(12) United States Patent
Shen et al.

(10) Patent No.: US 10,266,640 B2
(45) Date of Patent: Apr. 23, 2019

(54) CURABLE EPOXY RESIN COMPOSITION

(71) Applicant: BLUE CUBE IP LLC, Midland, MI (US)

(72) Inventors: Yue Shen, Shanghai (CN); Lei Yan, Shanghai (CN); Ray E. Drumright, Midland, MI (US); Liang Hong, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/527,498

(22) PCT Filed: Dec. 5, 2014

(86) PCT No.: PCT/CN2014/093093
§ 371 (c)(1),
(2) Date: May 17, 2017

(87) PCT Pub. No.: WO2016/086401
PCT Pub. Date: Jun. 9, 2016

(65) Prior Publication Data
US 2017/0327628 A1 Nov. 16, 2017

(51) Int. Cl.
*C08G 59/06* (2006.01)
*C09D 163/00* (2006.01)
*C08G 59/14* (2006.01)
*C08G 59/50* (2006.01)

(52) U.S. Cl.
CPC ....... *C08G 59/066* (2013.01); *C08G 59/1444* (2013.01); *C08G 59/5086* (2013.01); *C09D 163/00* (2013.01)

(58) Field of Classification Search
CPC .................................................. C08G 59/066
See application file for complete search history.

(56) References Cited

U.S. PATENT DOCUMENTS

| | | | |
|---|---|---|---|
| 4,272,416 A * | 6/1981 | Passalenti | C08G 59/1461 106/14.23 |
| 4,436,878 A * | 3/1984 | Batzill | C08G 59/02 204/502 |
| 4,652,597 A | 3/1987 | Itabashi et al. | |
| 4,654,597 A | 3/1987 | Hino | |
| 4,788,260 A * | 11/1988 | Batzill | C08G 59/02 525/423 |
| 5,252,637 A * | 10/1993 | Craun | C08F 283/10 523/406 |
| 5,849,855 A * | 12/1998 | Usui | C08G 18/089 528/45 |
| 6,548,189 B1 | 4/2003 | Gunasekaran et al. | |
| 6,627,726 B1 * | 9/2003 | Bruchmann | C08G 18/6254 525/123 |
| 6,710,139 B2 | 3/2004 | Hoyles et al. | |
| 7,812,101 B2 | 10/2010 | Fenn et al. | |
| 2009/0020039 A1 | 1/2009 | Fenn et al. | |
| 2012/0208016 A1 * | 8/2012 | Takahira | B32B 27/00 428/355 R |
| 2012/0208955 A1 * | 8/2012 | Yoshie | C08G 18/4233 524/604 |
| 2015/0024214 A1 * | 1/2015 | Cameron | C09D 163/00 428/413 |
| 2016/0159969 A1 * | 6/2016 | Chen | C07D 303/26 523/400 |
| 2016/0257813 A1 * | 9/2016 | Li | C08G 18/1833 |
| 2016/0257848 A1 * | 9/2016 | Li | C08G 18/58 |
| 2016/0264714 A1 * | 9/2016 | Li | C08G 18/4829 |
| 2017/0210939 A1 * | 7/2017 | Shen | C09D 163/04 |
| 2017/0233604 A1 * | 8/2017 | Watkins | C09D 175/04 427/427.4 |
| 2017/0292049 A1 * | 10/2017 | Jialanella | C09J 163/00 |

FOREIGN PATENT DOCUMENTS

| | | |
|---|---|---|
| CN | 102993422 A | 3/2013 |
| CN | 103881305 A | 6/2014 |
| EP | 0748830 A2 | 12/1996 |
| WO | 0071337 A1 | 11/2000 |
| WO | 2013138994 A1 | 9/2013 |
| WO | 2014117351 A1 | 8/2014 |
| WO | 2014179975 | 11/2014 |

OTHER PUBLICATIONS

International Search Report for Intenational Application No. PCT/CN2014/093093; Date of Filing: Dec. 5, 2014; dated Sep. 11, 2015; 3 pages.

Written Opinion of the International Searching Authority for Intenational Application No. PCT/CN2014/093093; Date of Filing: Dec. 5, 2014; dated Sep. 11, 2015; 3 pages.

* cited by examiner

*Primary Examiner* — Megan McCulley
(74) *Attorney, Agent, or Firm* — Karl E. Stauss; Cantor Colburn LLP

(57) ABSTRACT

An advanced epoxy resin including a reaction product of (A) at least one epoxy resin; (B) at least one cashew nutshell liquid; and (C) at least one multifunctional carboxylic acid; a curable epoxy resin composition prepared using the above advanced epoxy resin; and the use of the above curable epoxy resin composition to prepare a coating.

22 Claims, 2 Drawing Sheets

CURABLE EPOXY RESIN COMPOSITION

FIELD

The present invention is related to a curable epoxy resin composition and more specifically, the present invention is related to a curable epoxy resin coating composition having a low viscosity which is useful in coating applications.

BACKGROUND

Coil coating is a known process for providing paint or film coating to strip metals, such as steel or aluminum, on a continuous basis. The strip metals are typically coated with several layers on both surfaces of the strip metal; and one of the layers is a backer coating layer.

Typically, an epoxy-modified resin has been used in coil backer coating applications. For example, a "type 9" epoxy resin has been widely used to modify a hexa-methoxymethylmelamine (HMMM) cured polyester; and such epoxy-modified polyester resin has been used for coil backer coating applications. Together, the type 9 epoxy resin and the cured polyester resin achieve good performance balance for the coil backer coating in terms of thermal resistance (during curing), chemical resistance, flexibility, and good adhesion to polyurethane (PU) foam. However, the combination of the type 9 epoxy resin and the cured polyester resin has a disadvantage in that both the type 9 epoxy resin and the polyester resin are high molecular weight (e.g., greater than [>]3,800) products which exhibit very high viscosities (e.g., >4,600 mPa-s at 25° C.).

Thus, formulated paints made using the above known epoxy-modified polyester resin have low weight solid content (e.g., less than 60% by weight and about 40% by volume) and high (e.g., >about 420 g/L) volatile organic compounds (VOC). Typically, the weight solid content of the above known epoxy-modified polyester resin is normally less than 50 percent by volume (volume %); and the VOC content of the above known epoxy-modified polyester resin is normally greater than 420 g/L. In view of current environmental protection efforts and regulations, the market demand for high solid (e.g., greater than 50 volume %) coatings with low VOC (e.g., less than 420 g/L is becoming more important in the industry.

Heretofore, some attempts have been made to develop satisfactory high (e.g., >50 volume %) solid coatings with low (e.g., <420 g/L) VOC for coil backer coating applications. For example, CN102993422A discloses an epoxy-modified saturated polyester resin for an undercoat of a coil coating. The epoxy-modified saturated polyester resin includes the following components in parts by weight: 50-80 parts of methylpropanediol, 100-140 parts of epoxy resin 609, 110-150 parts of isophthalic acid, 110-150 parts of hexanedioic acid, 105-145 parts of neopentyl glycol, 0.1-0.6 part of organic tin, 20-40 parts of dimethylbenzene, 380-500 parts of S-150# solvent oil, and 30-60 parts of propylene glycol monomethyl ether.

EP0748830A2 discloses a modified epoxy resin obtainable by reacting an epoxy resin with up to one mol equivalent per epoxy group of an alkyl or alkenyl substituted, hydroxy substituted aromatic acid, more particularly, by reacting a bisphenol A-based epoxy resin with an alkylated salicylic acid.

U.S. Pat. No. 7,812,101 discloses a modified epoxy resin comprising the reaction product of a cycloaliphatic, a polycyclic and/or an aromatic biomass derived compound and an epoxy resin. Aqueous dispersions and coatings comprising the reaction products are also disclosed. The biomass compounds may include a blend of compounds such as abietic acid and cardanol which is the principal component of cashew nut shell liquid (CNSL).

An article by Sultania et al., "Studies on the synthesis and curing of epoxidized novolac vinyl ester resin from renewable resource material", European Polymer Journal 46 (2010) 2019-2032, discloses synthesizing a cardanol-based epoxidized novolac vinyl ester resin (CNEVER) by reacting a cardanol-based epoxidized novolac (CNE) resin and methacrylic acid (MA) (CNE:MA molar ratio 1:0.9) in the presence of triphenylphosphine as catalyst at 90° C. The CNE resin is prepared by reacting a cardanol-based novolac-type phenolic (CFN) resin and epichlorohydrin in a basic medium at 120° C. The above article teaches using a mono-functional acid (such as MA) during the disclosed synthesis process.

SUMMARY

In accordance with the present invention, it is highly desirable to produce an advanced curable epoxy resin composition wherein the composition exhibits the required properties for various applications, and in particular, for use in producing a backer coating for coil applications. Therefore, it is desired to prepare an advanced epoxy resin composition exhibiting a good balance of performance properties such as a high mechanical strength performance, a high temperature performance, and a high chemical resistance performance such that the epoxy resin composition can be used in producing a backer coating for coil.

One objective of the present invention is to provide a polyester-modified epoxy resin useful for preparing a high solids backer coating for coil. Another objective of the present invention is to modify an epoxy resin using a combination of a multifunctional carboxylic acid such as a dicarboxylic acid and cashew nutshell liquid (CNSL); and then using such modified epoxy resin in a coil coating. When a cashew nutshell liquid moiety is introduced into the advanced epoxy resin structure of the present invention, the chemical resistance of the cured article derived from the structure can be improved. The advanced epoxy resin composition of the present invention has a structure different from the structures disclosed in the above prior art.

Accordingly, one embodiment of the present invention is directed to an advanced epoxy resin including a reaction product of (A) at least one epoxy resin; (B) at least one cashew nutshell liquid; and (C) at least one multifunctional carboxylic acid.

Another embodiment of the present invention is directed to a process for preparing the above advanced epoxy resin composition.

Still another embodiment of the present invention is directed to a curable epoxy resin composition comprising (A) the above advanced epoxy resin composition, and (B) a hardener. Optionally, the curable composition can include a curing catalyst and/or other additives.

Yet another embodiment of the present invention is directed to a process for preparing the above curable epoxy resin composition.

Still another embodiment of the present invention includes a cured product produced using the above curable epoxy resin composition.

Advantageously, the present invention coil coating composition and process provides a means of coating strip metals before fabrication of finished components that is highly efficient, and that provides a backer coating for coil having a high quality, uniform and reproducible surface finish.

BRIEF DESCRIPTION OF THE DRAWINGS

For the purpose of illustrating the present invention, the drawings show a form of the present invention which is presently preferred. However, it should be understood that the present invention is not limited to the embodiments shown in the drawings.

DETAILED DESCRIPTION

Figure 1:
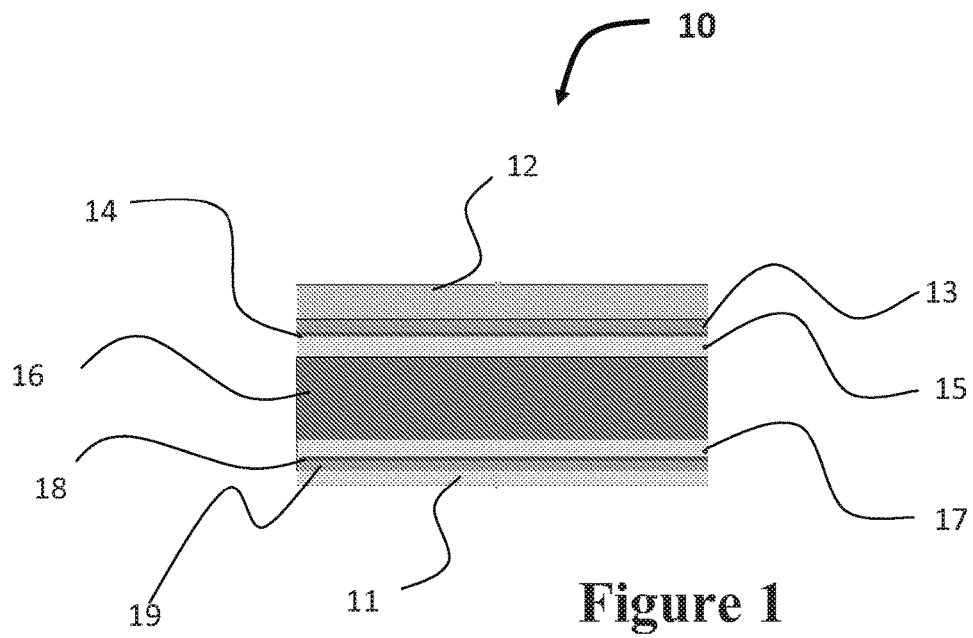
FIG. 1 is a schematic drawing of a coil coating structure showing the layered components of the coil coating structure.

One broad embodiment of the present invention includes a low viscosity epoxy resin reacted with a CNSL and a multifunctional carboxylic acid providing an advanced epoxy resin for coil coating applications. In one preferred embodiment, the advanced epoxy resin includes a reaction product of (A) at least one epoxy resin; (B) at least one CNSL; and (C) at least one multifunctional carboxylic acid. Other optional additives can be included in the above composition to form the advanced epoxy resin such as for example a solvent and other additives for various end use applications.

Epoxy resins, component (A), useful in preparing the advanced epoxy resin of the present invention can include a wide variety of epoxy compounds. For example, the epoxy compounds or polyepoxides can be aliphatic, cycloaliphatic, aromatic, hetero-cyclic and mixtures thereof. In one embodiment, epoxy compounds useful in the present invention desirably contain, on the average, one or more reactive oxirane groups. Epoxy resins useful in the embodiments described herein may include for example mono-functional epoxy resins, multi- or poly-functional epoxy resins, and combinations thereof. The epoxy resins useful in the present invention and the preparation of such epoxy resins are disclosed, for example, in Lee, H. and Neville, K., *Handbook of Epoxy Resins*, McGraw-Hill Book Company, New York, 1967, Chapter 2, pages 2-1 to 2-27, incorporated herein by reference.

In one preferred embodiment, a liquid epoxy resin is used in the present invention. The term "liquid epoxy resin" refers to an epoxy resin in a liquid state without adding any solvent. Generally, the Epoxy Equivalent Weight (EEW) of the liquid epoxy resin useful in the present invention is in the range of from about 150 to about 250 in one embodiment; from about 170 to about 220 in another embodiment, and from about 175 to about 200 in yet another embodiment.

Suitable examples of the liquid epoxy resin, component (A), useful in the present invention include, but are not limited to, D.E.R.™ 331; D.E.R.™ 354; D.E.R.™ 332; D.E.R.™ 330; and D.E.R.™ 383, which are commercial products available from The Dow Chemical Company; and mixtures thereof.

Generally, the amount of epoxy resin used in the present invention may be in the range of from about 40 weight percent (wt %) to about 80 wt % based on the total weight of the resin forming components of the composition in one embodiment, from about 50 wt % to about 75 wt % in another embodiment, and from 60 wt % to about 70 wt % in still another embodiment.

Another component useful for preparing the advanced epoxy resin of the present invention includes a cashew nut shell liquid (CNSL) compound as component (B). The CNSL may comprise for example cardanol, cardol, or mixtures thereof. The term "cardanol" herein refers to a mixture of phenols, wherein the phenols contain one hydroxyl group and wherein the phenols differ from one another in the number of C≡C bonds in the aliphatic side chain in the meta-position of the phenol.

In one embodiment for example, cardanol includes a naturally occurring phenol manufactured from CNSL. Cardanol is a monofunctional phenol having a long hydrocarbon chain in the meta position. For example, the cardanol useful in the present invention is one component of CNSL, an oil isolated from the shell of the cashew nut. In general, the chemical structure of cardanol is a phenol containing one hydroxyl group, and an aliphatic side chain of from 15 carbon atoms in the meta-position. Cardanol can be illustrated generally, for example, by the following chemical formula:

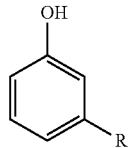

wherein R can be for example $C_{15}H_{31-n}$, and n can be for example a numerical integer of 0, 2, 4, or 6. Some specific side chains, R, of cardanol can include for example —$C_{15}H_{25}$, —$C_{15}H_{27}$, or —$C_{15}H_{29}$.

"Cardol" is a substituted resorcinol and can be illustrated more specifically, for example, by the following chemical formula:

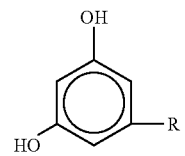

wherein R can be the same R described above with reference to cardanol.

In general, the CNSL used in the present invention may be, based on the total weight of the resin forming components of the composition, from about 5 wt % to about 60 wt % in one embodiment, from about 5 wt % to about 40 wt % in another embodiment, and from about 10 wt % to about 30 wt % in still another embodiment.

In general, in one embodiment, the concentration of cardanol in the CNSL can be for example greater than about 5 wt %; greater than about 10 wt % in another embodiment; greater than about 50 wt % in still another embodiment; greater than about 60 wt % in yet another embodiment; greater than about 80 wt % in even still another embodiment; and greater than about 90 wt % in even yet another embodiment. In other embodiments, the cardanol in the CNSL can be for example less than about 95 wt % in one embodiment, less than about 90 wt % in another embodiment, and less than about 80 wt % in still another embodiment. Generally, the concentration of cardanol in the CNSL can be for example in the range of from about 5 wt % to about 95 wt % in one embodiment; from about 10 wt % to about 95 wt % in another embodiment; from about 50 wt % to about 90 wt % in still another embodiment; from about 60 wt % to about 95 wt % in yet another embodiment; and from about 80 wt % to about 95 wt % in even still another embodiment.

The compound useful as component (C) for preparing the advanced epoxy resin of the present invention may include at least one multifunctional carboxylic acid compound, but is at least a difunctional carboxylic acid, i.e., at least a dicarboxylic acid. In one embodiment, the multifunctional carboxylic acid contains from 2 to about 34 carbon atoms in aliphatic or aromatic moieties and 2 carboxyl groups. The multifunctional carboxylic acid used in the present invention can preferably include one or more multifunctional carboxylic acids. For example, the multifunctional carboxylic acid of the present invention can be one or more multifunctional carboxylic acids selected from the group consisting of phthalic acid, terephthalic acid, isophthalic acid, adipic acid, succinic acid, glutaric acid, fumaric acid, maleic acid, cyclohexane dicarboxylic acid, trimellitic acid, azeleic acid, sebacic acid, dimer acid, and mixtures thereof.

Generally, the amount of multifunctional carboxylic acid used in the present invention may be in the range of from about 0.001 wt % to about 45 wt % based on the total weight of the advanced resin forming components of the composition in one embodiment, from about 5 wt % to about 35 wt % in another embodiment, from 5 wt % to about 25 wt % in still another embodiment, and from 5 wt % to about 15 wt % in yet another embodiment.

One preferred embodiment of the present invention includes a novel advanced epoxy resin composition derived from reaction of an epoxy resin with a difunctional carboxylic acid and CNSL to form resins comprising the general chemical structure:

show that the advanced epoxy resin composition of the present invention can assist in achieving up to a 50% volume solid content coating with balance performance properties such as thermal resistance (during curing), chemical resistance, flexibility and adhesion such as for example increased adhesion to a polyurethane material. In addition, the epoxy resin composition of the present invention is readily and economically made.

One optional compound that can be added to the above components to produce the advanced epoxy resin of the present invention may include a catalyst. This catalyst is used to promote the reaction of the epoxy resin, component (A), the phenolic OH functionality of the CNSL compound, component (B), and the acid compound, component (C).

In one embodiment, the optional catalyst useful in the present invention can preferably include one or more catalysts. For example, the catalyst suitable for use in the present invention can be one or more catalysts from the group consisting of ethyl triphenyl phosphonium acetate, sodium hydroxide (NaOH), potassium hydroxide (KOH), imidazole, triethylamine, and mixtures thereof.

Generally, the amount of optional compound, when used in the present invention, may be in the range of from 0 wt % to about 3 wt % based on the total weight of the advanced resin forming components of the composition in one embodiment, from about 0.01 wt % to about 2 wt % in another embodiment, from 0.1 wt % to about 1.5 wt % in still another embodiment, and from about 0.1 wt % to about 1.0 wt % in yet another embodiment.

Other optional compounds useful for preparing the advanced epoxy resin of the present invention and that can be added to the reaction product composition may include for example solvents. A solvent may be used during the synthesis process to reduce the viscosity of the resultant products. The solvents useful in the present invention are organic solvents and can include for example, but are not limited to, n-butyl acetate, xylene, (mono) propylene glycol (mono) methyl ether (PM), acetone, methyl ethyl ketone, methyl isobutyl ketone, dimethylformamide, dimethyl sulfoxide, and mixtures thereof. Aromatic solvents such as

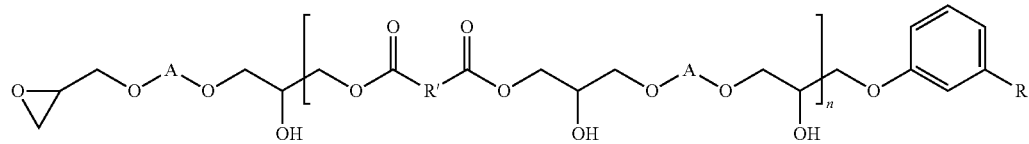

where n can be 1 to 20; A can be a moiety having from 2 to about 50 carbon atoms such as for example, A can be a divalent moiety selected from isopropylidenediphenylene, phenylene, biphenylene, —(CH$_2$)$_4$—, —(CH$_2$)$_6$—, —CH$_2$CH$_2$—, cyclohexane dimethylene, or combinations thereof; R is a straight-chain alkyl with 15 carbons containing from 0 to 3 carbon-carbon double bond(s) (C≡C) such as for example R can be selected from —C$_{15}$H$_{31}$, —C$_{15}$H$_{29}$, —C$_{15}$H$_{27}$, and —C$_{15}$H$_{25}$; and R' can be a moiety having from 2 to about 34 carbon atoms such as for example R' can be a bivalent group having an aliphatic (—(CH$_2$)$_x$—), wherein x can be 2 to 34 structure, a polyoxyalkylene structure, cycloaliphatic structure, or an aromatic polycyclic structure, and the like.

The advanced epoxy resin composition of the present invention has low viscosity (e.g., <56,000 mP·s at 70° C.) compared to a type 9 epoxy resin. Performance evaluations Solvesso-100 and Solvesso-150, commercially available ExxonMobil Chemical, may also be used as the solvent.

Other optional compounds that can be used during the synthesis process may include for example, a phenol compound such as bisphenol A (BPA) to adjust the hardness of the advanced epoxy resin, an accelerator, a catalyst, other additives, and mixtures thereof.

Generally, the amount of optional compound, when used in the present invention, may be in the range of from 0 wt % to about 50 wt % based on the total weight of the advanced resin forming components of the composition in one embodiment, from about 0.01 wt % to about 40 wt % in another embodiment, from 0.1 wt % to about 30 wt % in still another embodiment, and from about 0.1 wt % to about 20 wt % in yet another embodiment.

The process for preparing the advanced epoxy resin of the present invention includes admixing: an epoxy resin, CNSL, a multifunctional carboxylic acid, and optionally, any desired optional additives. For example, the preparation of the advanced epoxy resin includes preparing a reaction mixture by blending, in known mixing equipment, the epoxy compound, the CNSL, the multifunctional carboxylic acid, and optionally any other desirable additives.

In preparing the advanced epoxy resin, the relative amounts of the above three components (A), (B) and (C) may be measured in terms of molar ratios. For example, the molar ratio of the epoxy resin, the CNSL and the multifunctional carboxylic acid can be in the range from about 1:0.05:0.05 to about 1:1:0.5 in one embodiment; and from about 1:0.25:0.1 to about 1:0.75:0.3 in another embodiment.

All of the compounds to prepare the advanced epoxy resin are typically mixed and dispersed at a reaction temperature enabling the preparation of an effective advanced epoxy resin. For example, the reaction temperature during the mixing of all components may be generally from about 100° C. to about 200° C. in one embodiment, from about 130° C. to about 170° C. in another embodiment, and 140° C. to about 160° C. in still another embodiment.

In a preferred embodiment, the method for preparing the advanced epoxy resin may be carried out using the following steps: (a) charging the CNSL, the multifunctional carboxylic acid and the epoxy resin as a reaction mixture into a reactor with stirring; (b) heating the reaction mixture in the reactor to a first temperature of about 130° C.; (c) adding a catalyst such as ethyl triphenyl phosphonium acetate catalyst into the reactor with stirring; and (d) heating the reaction mixture at a raised second temperature of from about 140° C. to about 170° C. The above reaction is stopped after about 2 hours when the target epoxide equivalent weight of the reaction product is achieved. Generally, the reaction time can be, for example, from about 5 minutes (min) to about 24 hours (hr) in one embodiment; from about 30 min to about 8 hr in another embodiment; and from about 60 min to about 4 hr in still another embodiment.

The preparation of the advanced epoxy of the present invention, and/or any of the steps thereof, may be a batch or a continuous process. The mixing equipment used in the process may be any vessel and ancillary equipment well known to those skilled in the art.

Some the advantages of using the advanced epoxy of the present invention to produce a final product can include for example, the final products contain a high weight solid content and a low volatile organic compound (VOC) content.

The use of the advanced epoxy resin of the present invention provides a final product exhibiting a good balance of performance properties such as a high mechanical strength performance, a high temperature performance, and a high chemical resistance performance. The use of the advanced epoxy resin of the present invention also provides a final product resin exhibiting the required properties for various applications. For example, the advanced epoxy resin of the present invention is especially desirable for preparing a resin composition useful for backer of coil coating applications.

One of the beneficial properties of the advanced epoxy resin may be a reduced viscosity or low viscosity such that the viscosity of an advanced epoxy resin of the present invention may be, for example, generally less than about 60,000 mPa-s in one embodiment, less than about 50.000 mPa-s in another embodiment, less than about 40,000 mPa-s in still another embodiment, and less than about 30,000 mPa-s in yet another embodiment; the above viscosities measured at 70° C. Generally, the viscosity of the advanced epoxy resin can be in the range of from about 20,000 mPa-s to about 60,000 mPa-s in one embodiment, from about 25,000 mPa-s to about 55,000 mPa-s in another embodiment, and from about 30,000 mPa-s to about 50,000 mPa-s in still another embodiment; the above viscosities measured at 70° C.

Another beneficial property of the advanced epoxy resin may be a high decomposition temperature (Td) such that the Td of the advanced epoxy resin of the present invention may be, for example, generally greater than about 300° C. in one embodiment, greater than about 310° C. in another embodiment, greater than about 320° C. in still another embodiment, and greater than about 330° C. in yet another embodiment. Generally, the Td of the advanced epoxy resin can be, for example, in the range of from about 300° C. to about 350° C. in one embodiment, from about 310° C. to about 345° C. in another embodiment, and from about 320° C. to about 340° C. in still another embodiment.

Another broad embodiment of the present invention is directed to providing a curable epoxy resin formulation or composition including: (I) the above-described advanced epoxy resin, and (II) a hardener. Other optional additives known to the skilled artisan can be included in the curable composition such as for example a curing catalyst and other additives for various end use applications.

The advanced epoxy resin described above can be used as component (I) of curable epoxy resin composition of the present invention. The advanced epoxy resin can be used alone or in combination with one or more other epoxy compounds ("second epoxy") different from the advanced epoxy resin. The second epoxy compound may include, for example any of the epoxy compounds described above with reference to the advanced epoxy resin. For example, some of the commercially available epoxy resins that can be used as the second epoxy resin according to the present invention may include for example D.E.R.™ 331, D.E.N.™ 438, D.E.R. 671, D.E.R. 852, available from The Dow Chemical Company, and mixtures thereof.

Generally, the amount of the second epoxy resin compound, when used in the present invention, may be in the range of from about 30 wt % to about 90 wt % based on the total weight of the resin forming components of the composition in one embodiment, from about 35 wt % to about 80 wt % in another embodiment, and from 40 wt % to about 70 wt % in still another embodiment.

The curable epoxy resin composition of the present invention is made curable by including in the composition a hardener compound. In general, the hardener (also referred to as a curing agent or crosslinking agent), component (II), is blended with the advanced epoxy to prepare the curable composition of the present invention.

The hardener of the present invention may include for example, any conventional hardener known in the art useful for including in a curable epoxy resin composition. The hardener useful in the curable composition may be selected from, for example but are not limited to, amino resins, anhydrides, carboxylic acids, amine compounds, phenolic compounds, or mixtures thereof. In a preferred embodiment, the hardener useful in the present invention may be selected from, for example, melamine-formaldehyde resins, urea-formaldehyde resins, glycoluril-formaldehyde resins, methacrylamide-formaldehyde resins, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

Generally, the amount of hardener used in the present invention may be, for example, in the range of from about 5 wt % to about 25 wt % based on the total weight of the resin forming components of the composition in one embodiment, from about 10 wt % to about 20 wt % in another embodiment, and from 12 wt % to about 18 wt % in still another embodiment.

A curing catalyst may be optionally added to the curable epoxy resin composition of the present invention as component (III) to speed up the curing process of the curable epoxy resin composition. Examples of suitable catalyst useful for the curable epoxy resin composition may include tris(dimethylaminomethyl)-phenol, bis(dimethylaminomethyl)-phenol, salicylic acid, maleic acid, citric acid, phosphoric acid, bisphenol A, p-toluene sulfonic acid, or mixtures thereof.

Generally, the amount of the optional curing catalyst described above, when used in the present invention, may be in the range of from 0 wt % to about 5 wt % based on the total weight of the resin forming components of the composition in one embodiment, from about 0.01 wt % to about 3 wt % in another embodiment, and from 0.1 wt % to about 2 wt % in still another embodiment.

The curable epoxy resin composition of the present invention may include other optional compounds. The optional compounds that may be added to the curable composition of the present invention may include compounds that are normally used in resin formulations known to those skilled in the art for preparing curable compositions and thermosets. For example, the other optional compounds that may be added to the curable epoxy resin composition of the present invention may include additives generally known to be useful for the preparation, storage, application, and curing of epoxy resin compositions.

For example, other optional additives customarily used in epoxy resin compositions may be added to the epoxy resin composition of the present invention including, for example, one or more of the following compounds: anti-foaming agents, flowing agents, solvents, pigments, extenders, matting agents, fillers, leveling assistants, and the like, or mixtures thereof. The solvent can be selected from, for example, ketones, ethers, aromatic hydrocarbons, glycol ethers, cyclohexanone and combinations thereof.

Generally, the amount of the optional additives described above, when used in the present invention, may be in the range of from 0 wt % to about 50 wt % in one embodiment, based on the total weight of the resin forming components of the composition in one embodiment, from about 0.001 wt % to about 40 wt % in another embodiment, from about 0.01 wt % to about 5 wt % in still another embodiment, from about 0.01 wt % to about 3 wt % in yet another embodiment, and from 0.1 wt % to about 2 wt % in even still another embodiment.

The process for preparing the curable epoxy resin composition of the present invention includes admixing: the advanced epoxy resin of the present invention and other optional second epoxy resins, a hardener, and optionally, a curing catalyst and/or other optional additives. For example, the preparation of the curable epoxy resin formulation of the present invention is achieved by blending, in known mixing equipment, the advanced epoxy compound, the curing agent, and optionally any other desirable additives. Any of the above-mentioned optional additives, for example a catalyst, may be added to the curable composition during the mixing or prior to the mixing to form the curable composition.

All of the compounds of the curable formulation are typically mixed and dispersed at a temperature enabling the preparation of an effective curable epoxy resin composition. For example, the temperature during the mixing of all components may be generally from about 0° C. to about 80° C. in one embodiment, and from about 15° C. to about 60° C. in another embodiment. Lower mixing temperatures help to minimize reaction of the epoxide and hardener in the composition to maximize the pot life of the composition.

The preparation of the curable formulation of the present invention, and/or any of the steps thereof, may be a batch or a continuous process. The mixing equipment used in the process may be any vessel and ancillary equipment well known to those skilled in the art.

Some the advantages of the curable epoxy resin composition of the present invention include for example enhanced properties such as (1) a high weight solid content, (2) a reduced viscosity, and (3) an enhanced adhesion.

By "high weight solid content" it is meant herein means a solid content of curable epoxy resin composition of generally greater than about 60% solid content by weight in one embodiment, greater than about 65% solid content by weight in another embodiment, greater than about 70% solid content by weight in still another embodiment, and greater than about 75% solid content by weight in yet another embodiment.

Generally, the solid content of curable epoxy resin composition can be in the range of from about 60% solid content by weight to about 75% solid content by weight in one embodiment, from about 60% solid content by weight to about 70% solid content by weight in another embodiment, and from about 60% solid content by weight to about 65% solid content by weight in still another embodiment.

By "reduced viscosity" or "low viscosity" it is meant herein the viscosity of a curable epoxy resin composition of the present invention is lower than an epoxy resin that is typically used in a backer coating such as for example when compared to the viscosity of D.E.R. 669. For example, the viscosity of D.E.R 669 at 25° C. is from about 4,600 mPa·s to about 14,800 mPa·s at 40% in diethylene glycol monobutyl ether (DB) The softening point for D.E.R. 669 is from 130° C. to 170° C.

Generally, the viscosity of curable epoxy resin composition of the present invention can be less than about 60,000 mPa-s in one embodiment, less than about 50,000 mPa-s in another embodiment, less than about 40,000 mPa-s in still another embodiment, and less than about 30,000 mPa-s in yet another embodiment; the viscosities measured at 70° C. In another embodiment, the viscosity of curable epoxy resin composition can be in the range of from about 20,000 mPa-s to about 60,000 mPa-s, from about 25,000 mPa-s to about 55,000 mPa-s in still another embodiment, and from about 30,000 mPa-s to about 50,000 mPa-s in yet another embodiment; the viscosities measured at 70° C.

The curable composition can have a low VOC such as for example, generally less than about 420 g/L in one embodiment, and in the range of from about 350 g/L to about 420 g/L in another embodiment, from about 370 g/L to about 420 g/L in another embodiment, and from about 400 g/L to about 420 g/L in still another embodiment.

Another embodiment of the present invention includes a process for curing the curable epoxy resin composition described above to form a thermoset or cured composition. For example, the curable epoxy resin composition or formulation of the present invention can be cured under conventional processing conditions to form a film, a coating, or a solid. Curing the curable composition may be carried out at curing reaction conditions including a predetermined temperature and for a predetermined period of time sufficient to cure the composition. The curing conditions may be dependent on the various components used in the curable composition such as the hardener used in the formulation.

The curing reaction conditions include, for example, carrying out the reaction under a temperature, generally in the range of from about 120° C. to about 300° C. in one embodiment; from about 150° C. to about 250° C. in another embodiment; and from about 200° C. to about 250° C. in still another embodiment.

For coil backer coating applications, the curable epoxy resin composition is applied to substrates by drawdown bar, roller, knife, or other conventional method practiced in the coil industry; and then cured at the curing temperatures described above in a conventional oven.

The cured product (i.e., the cross-linked product made from the curable composition) of the present invention shows several improved properties over conventional epoxy cured resins. For example, the cured product or composite of the present invention may advantageously exhibit (1) good adhesion performance to polyurethane (PU) foam; (2) good mechanical performance such as a good balance of hardness and flexibility performance; and (3) good chemical resistance such as good MEK double rubs.

The adhesion performance of the cured thermoset of the present invention is measured by the cross hatch adhesion test according to ASTM D3359 as described in more detail herein below; and applying the rating scale of from "0B" to "5B" described in ASTM D3359. Using the rating scale of from "0B" to "5B" for the adhesion test, the cured thermoset exhibits an adhesion rating value of at least "4B" based on the rating scale. The above adhesion performance of the backer coating relates to the adhesion of the backer coating to PU materials using a cross hatch test to obtain the quantifiable results set forth above.

The flexibility performance of the cured thermoset of the present invention is measured by the T-bend flexibility method according to ISO17132; and applying the rating scale of from "0 T" to "4 T" described in ISO17132. Using the above rating scale, the flexibility of a cured thermoset made from the epoxy resin composition of the present invention can be generally less than about 4 T in one embodiment, less than about 2 T in another embodiment, and less than about 1 T in still another embodiment as measured by the T-bend test. Generally, the flexibility of the cured thermoset can be in the range of from about 0 T to about 3 T in one embodiment, from about 0 T to about 2 T in another embodiment, and from about 0 T to about 1 T in still another embodiment as measured by the T-bend test.

Hardness is another property that can be measured on the coating product. The hardness of the cured thermoset can be carried out in accordance with the pencil hardness method of ASTM D3363 as described in more detail herein below; and applying the alphanumeric rating scale described in ASTM D3363. Using the above rating scale, the hardness of a cured thermoset made from the epoxy resin composition of the present invention can be generally in the range of from about 1H to about 4H in one embodiment, from about 2H to about 4H in another embodiment, and from about 3H to about 4H in still another embodiment as measured by the pencil hardness test.

Chemical resistance or solvent resistance is yet another property that can be measured on the coating product. The chemical resistance of the cured thermoset can be carried out in accordance with the MEK double rubs test described in ASTM D5402. Using methyl ethyl ketone as a solvent, the MEK double rubs test measures the number of double rubs it takes to degrade or delaminate (as determined by visual observation) a film sample. The MEK double rubs of a cured thermoset made from the epoxy resin composition of the present invention can be generally greater than about 50 in one embodiment, greater than about 100 in another embodiment, and greater than about 150 in still another embodiment.

Generally, the MEK double rubs of the cured thermoset can be in the range of from about 50 to about 200 in one embodiment, from about 100 to about 200 in another embodiment, and from about 150 to about 200 in still another embodiment.

The cured product made from the curable composition advantageously exhibits a combination and balance of the above mentioned properties including for example processability, Tg, mechanical performance, thermal performance, chemical resistance, and the like.

In a preferred embodiment, for example, the curable epoxy resin composition of the present invention is especially desirable for preparing a backer coating for coil with enhanced adhesion or a good adhesion performance between the backer coating and PU foam for making sandwich building materials.

As one illustration of the present invention, but not to be limited thereto, a coating product of the present invention preferably exhibits the following properties such that the coating can be used as a backer coil coating product: a T-bend (no take-off [NTO]) of 4 T; a MEK double rub of greater than or equal to ($\geq$) 50; a pencil hardness of $\geq$F; and a polyurethane foaming adhesion of $\geq$4B.

Optionally, the backer coating can also exhibit a reverse impact resistance of $\geq$7 J as measured by AS 2728-1984: "Prepainted and Organic Film/metal Laminate Products—Performance Requirements for Interior/exterior Applications in Buildings". In some instances gloss can also be a backer coating property to be measured; and the gloss can be adjusted using a matting agent.

The curable epoxy resin composition of the present invention includes an advanced epoxy resin that advantageously delivers unique properties to the resulting cured product. As aforementioned, the curable epoxy resin composition of the present invention may be used to prepare a backer coating for coil applications. The present inventive epoxy resin composition may also be used for a coil primer.

As one illustration of the present invention, but not to be limited thereto, a coil coating is shown in FIG. 1. With reference to FIG. 1, there is shown a layered structure of a coil coating structure, generally indicated by numeral 10. The various layers of the coil coating include a backer coil coating layer 11 and a topcoat layer 12 with several layers in-between the backer 11 and topcoat 12 including for example, a first primer layer 13, a first pre-treatment layer 14, a first zinc (hot-dip galvanizing [HDG]) or zinc-aluminum layer 15, a cold rolled steel layer 16, a second zinc (HDG) or zinc-aluminum layer 17, and a second pre-treatment layer 18, and a second primer layer 19.

The process of manufacturing the coil coating structure 10 including assembling the various layers, including the backer coil coating layer 11, the thickness of the layers, and the number of the layers can be readily determined by those skilled in the art. For example, the process described in "Coil Coating: Sustainable Process Sustainable Products" by Environmental Statistics of the European Coil Coating Industry (ECCA), May 11, 2012, can be used in the present invention to manufacture the coil coating structure 10.

EXAMPLES

The examples which follow further illustrate the present invention in detail but are not to be construed to limit the scope thereof. All parts and percentages are by weight unless otherwise indicated.

Various terms, designations and materials used in the following examples are described in Table I.

TABLE I

Raw Materials

| Material | Function | Main Composition | Weight Solid Content % | Supplier |
| --- | --- | --- | --- | --- |
| D.E.R.383 | epoxy | liquid epoxy resin | 100 | The Dow Chemical Company |
| D.E.R.671 | epoxy | solid epoxy resin | 100 | The Dow Chemical Company |
| D.E.R.664 | epoxy | solid epoxy resin | 100 | The Dow Chemical Company |
| D.E.R.669 | epoxy | solid epoxy resin | 100 | The Dow Chemical Company |
| HD-F170 | CNSL | cardanol >85% | 100 | Huada Saigao Co., Ltd |
| adipic acid | acid | aliphatic dicarboxylic acid | 100 | |
| Desmodur L75 | polyurethane | aromatic polyisocyanate | 100 | Bayer Material Science |
| PEG200 | polyol | polyol | 100 | The Dow Chemical Company |
| RP1619 Polyester | polyester | polyester | 40 | Nuplex |
| Cymel 303 | co-reactive agent | methylated hexamethoxymethyl melamine | 100 | Cytec |
| ethyl triphenyl phosphonium acetate | catalyst | ethyl triphenyl phosphonium acetate | 100 | The Dow Chemical Company |
| NACURE 2500 | catalyst | p-toluene sulphonic acid | 100 | King |
| titanium dioxide | pigment | $TiO_2$ | 100 | DuPont |
| xylene | solvent | xylene | 0 | Sinopharm Co., Ltd |
| butyl carbitol acetate | solvent | butyl carbitol acetate | 0 | Sinopharm Co., Ltd |
| n-butyl acetate | solvent | n-butyl acetate | 0 | Sinopharm Co., Ltd |
| n-butanol | solvent | n-butanol | 0 | Sinopharm Co., Ltd |

In the following Examples, standard analytical equipment and methods are used such as for example:

Viscosity

Viscosity of the curable composition is measured using Brookfield CAP-2000+ with #6 spindle according to the method of ASTM D445.

Epoxide Equivalent Weight (EEW)

The epoxide equivalent weight (EEW) of the epoxy resin compound used in the curable composition is determined by using Mettler Toledo T70 Titrator according to test method of ASTM D1652.

Decomposition Temperature (Td)

Decomposition temperature (Td) is measured using TGA Q50 of TA Instruments according to the method of IPC-TM-650

Film Thickness

Film thickness is measured using a BYK dry film thickness gauge. A minimum of 5 readings are taken using the BYK dry film thickness gauge; and the results of the 5 readings are averaged.

Solvent Resistance—MEK Double Rubs

ASTM D5402 using methyl ethyl ketone is used to determine the solvent resistance. The number of double rubs is recorded when degradation or delamination of the film is observed.

Pencil Hardness

Pencil hardness is measured according to the test method of ASTM D3363. Pencil hardness is used to determine the relative hardness of a cured coating film in terms of drawing pencil leads of differing hardness on the surface of the coating film. For example, a series of pencils provide a wide range of grades for hardness from 9H, 8H, . . . , 2H, H, F, HB, B, 2B, . . . , 8B, 9B; wherein "9H" is the hardest using the hardest lead and wherein "9B" is the softest using the softest lead.

The pencil hardness can be performed in a laboratory using the following procedure:

(a) Place a test panel flat on the bench top.
(b) Select the pencil that represents the upper limit (hardness) acceptable and desired.
(c) Expose ⅛ inch (3 mm) of the lead.
(d) Dress the lead tip by rubbing the lead across the #400 grip paper in straight back and forth strokes, holding the pencil perpendicular to the paper.
(e) Hold the pencil over the panel at a 45° angle and bring the lead into contact with the paint film.
(f) Push the pencil across the test panel for a distance of about 25 mm (1 inch), attempting to scratch the paint film and applying as much downward pressure as possible without breaking the lead.
(g) Rotate the pencil 180° exposing a fresh cutting edge of the lead, and repeat steps (e) and (f).
(h) If the paint film is cut by the lead for a distance of at least 1\8 inch (3 mm) the test is called a failure for the lead used. If the test is a failure select the next softer pencil and repeat steps (f) through (h). Continue this process until a pass is achieved. If the test passes move to step (i).

(i) If the test in step (h) passes, select the next harder pencil and repeat steps (f) through (h). Continue this process until a failure is achieved.

(j) Record the results.

T-Bend Flexibility

T-bend flexibility is determined according to the method of ISO17132.

Cross Hatch Adhesion

The method used to determine the adhesion performance of a cured product is carried out as follows:

Step 1: apply a PU coating to a cured backer coating film; and

Step 2: evaluate the adhesion of PU coating to backer coating according to ASTM D3359.

The cross hatch adhesion test is used to assess the adhesion of a PU coating to a backer coating film. The evaluation can be conducted according to the following procedure:

(a) Place a test panel flat on the bench top.

(b) Place a crosshatch blade on the test panel and make a cut about 50 mm (2 inches) in length, in one steady motion using sufficient pressure on the blade to cut to the backer coating film.

(c) Make a second cut 90° to the first in step (b). The second cut should intersect the first in about the middle of the scribe.

(d) Brush the film lightly with a clean rag to remove any detached flakes or ribbons of coating, caused by the cuts.

(e) Place the center of a tape over the grid made by the cuts and smooth into place over that area with a finger.

(f) Grasp the tape tab and remove the tape from the panel with a quick even motion at a 180° angle.

(g) Visually inspect the grid area for any removal of PU coating from the backer coating.

(h) Rate the adhesion in accordance with the following scale:

5B=The edges of the cuts are completely smooth, and none of the squares in the grid are detached.

4B=Small flakes of the coating are detached at intersections, and less than 5% of the area is affected.

3B=Small flakes of the coating are detached along the edges and at intersections of cuts, and the area is 5% to 15% of the grid.

2B=The coating has flaked along the edges and on parts of the squares, and the area affected is 15% to 35% of the grid.

1B=The coating has flaked along the edges of the cuts in large ribbons and whole squares have detached, and the area affected is 35% to 65% of the grid.

0B=Flaking and detachment worse than grade 1B.

(i) Record results.

Once the cured product is on a PU foam substrate the adhesion of the cured coating product is given a rating from the rating scale described in ASTM D3359 based on cross hatch adhesion of the coatings measured according to ASTM D3359.

Example 1—Synthesis of Advanced Epoxy

D.E.R.383 epoxy resin (72.0 g), adipic acid (14.6 g) and CNSL (HD-F170, cardanol >85%, 18.0 g) were charged into a four-neck glass flask reactor equipped with a mechanical stirrer, a condensation tube, and a nitrogen charging adapter. After slowly raising the temperature of the reactor to 130° C., the temperature was held constant for 5 min. Then 500 part per million (ppm) of ethyl triphenyl phosphonium acetate (70% solution in methanol) was charged into the flask. Then the reaction temperature of the reaction mixture was raised to 160° C. The EEW of the reaction mixture was monitored during the reaction. The reaction was stopped after 2 hr. The resultant product, by visual observation, appeared to be clear and viscous. The EEW of the resultant product was measured to be 799 g/eq.

Example 2—Synthesis of Advanced Epoxy

The same procedure described in Example 1 was used in this Example 2 except that 72.0 g of D.E.R.383 epoxy resin, 14.6 g of adipic acid, and 22.5 g of CNSL (HD-F170, cardanol >85%) were charged into the four-neck glass flask reactor. The clear and viscous resultant product of this Example 2 had an EEW of 1047(g/eq).

Viscosity Comparison

The viscosity of the advanced epoxy resin composition prepared in Examples 1 and 2 were measured according to the viscosity measurement method described above. Table II describes the viscosities of the advanced epoxy resin products prepared in Example 1 and Example 2 compared to the viscosities of a liquid epoxy resin (e.g., D.E.R. 383) and several solid epoxy resin products (e.g., D.E.R.671, D.E.R.664, and D.E.R.669). The advanced epoxy resins of Examples 1 and 2 at 70° C. are in the liquid state with viscosities of 56,230 and 28,875 respectively. Meanwhile, the commercial epoxy resin products: D.E.R.671 (a type 1 epoxy resin), D.E.R.664 (a type 4 epoxy resin) and D.E.R.669 (a type 9 epoxy resin) are in the solid state at 70° C. ("Type 1" etc. is a common epoxy industry term to characterize epoxy resins based on the resins' molecular weight [Mw]).

TABLE II

Viscosity Comparison of Epoxy Resins

| Resin Product | D.E.R. 383 | D.E.R.671 | D.E.R.664 | D.E.R.669 | Resin of Example 1 | Resin of Example 2 |
|---|---|---|---|---|---|---|
| Viscosity at 70° C., mPa-s | 9000-10500 @25° C. | NA, solid* (Softening points is 75-85° C.*) | NA, solid* (Softening points is 100-110° C.*) | NA, solid* (Softening points is 130-170° C.*) | 56,230 | 28,875 |

*At 70° C., D.E.R. 671, D.E.R. 664 and D.E.R. 669 are solid and are therefore not measurable.

Thermal Gravimetric Analysis (TGA) Evaluation

The decomposition temperature (Td) of the advanced epoxy resin composition prepared in Examples 1 and 2 were measured according to the Td measurement method described above. Table III describes Example 1 and Example 2 having a higher Td than a type 1 epoxy resin (D.E.R.671) and a liquid epoxy resin (D.E.R. 383)—a bisphenol A type epoxy resin.

TABLE III

Td Comparison

| Product | D.E.R.383 | D.E.R.671 | D.E.R.664 | D.E.R.669 | Example 1 | Example 2 |
|---------|-----------|-----------|-----------|-----------|-----------|-----------|
| Td, °C. | 258 | 295 | 363 | 395 | 327 | 338.13 |

Example 3 and Comparative Examples A and B—Coating Formulations

The advanced epoxy resin synthesized in Example 1, RP1619 Polyester, and D.E.R.669 were ingredients used to formulate a coil backer coating formulation (Example 3) as described in Table IV. The coating formulation of Example 3 with the material of Example 1 was compared to coil backer coating formulations (Comparative Example A and Comparative Example B) without the material of Example 1 as described in Table IV.

As described in Table IV, the coating formulation of Example 3 has a 70 wt % solid content compared to the two comparative coating formulations of Comparative Example A and Comparative Example B whose solid contents are 50 wt % each. As described in Table V, despite having higher solids, the coating formulation of Example 3 (70 wt % solid content) has a lower initial viscosity compared to the coating formulations of Comparative Example A and Comparative Example B, 50 wt % solid content). The results described in Table IV show that the present inventive coating formulation of Example 3 facilitates low VOC formulations.

TABLE IV

Backer Coating Formulations

| Ingredient | Comparative Example A (wt %) | Comparative Example B (wt %) | Example 3 (wt %) |
|---|---|---|---|
| RP1619 Polyester (40% weight solid) | 55.52 | 72.87 | 0.00 |
| D.E.R.669 | 7.34 | 0.00 | 0.00 |
| Example 1 | 0.00 | 0.00 | 40.86 |
| Cymel 303 | 4.81 | 4.75 | 6.65 |
| NACURE 2500 | 0.38 | 0.38 | 0.53 |
| titanium dioxide | 15.66 | 15.45 | 21.66 |
| butyl carbitol acetate | 1.03 | 1.02 | 1.42 |
| xylene | 9.64 | 0.00 | 13.33 |
| n-butyl acetate | 0.00 | 0.00 | 7.77 |
| n-butanol | 5.62 | 5.55 | 7.77 |
| Total | 100.00 | 100.00 | 100.00 |
| Solid content, wt % | 50.00 | 50.00 | 70.00 |
| Solid content, V % | 45.2 | 43.3 | 57.3 |
| VOC g L$^{-1}$ | 525.6 | 516.4 | 357.5 |

Example 4 and Comparative Examples C and D—Coatings

The coil backer coating formulations described in Table IV above were coated onto coil and cured to form coating films. The coatings were cured at 150° C. for 30 min before testing. Example-4 is a coating prepared using the formulation of Example-3, and Comparative Examples C and D are coatings prepared using the formulations of Comparative Examples A and B, respectively.

The results of the performance tests administered to the coil backer coating films prepared in this Example are described in Table V. For example, the results of the T-bend flexibility and pencil hardness tests of the coating film of Example 4 are comparable with the results of the coating films of Comparative Examples C and D.

Figure 2:
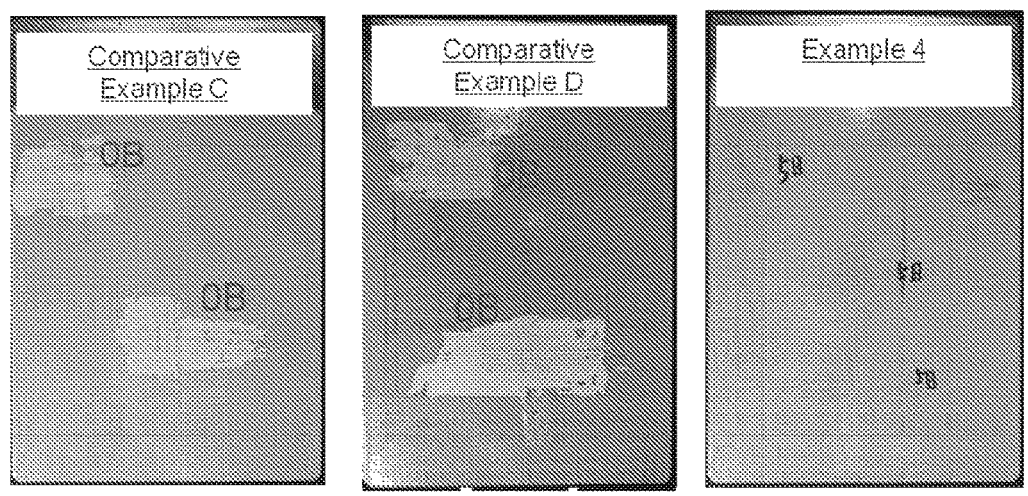
FIG. 2 is a photograph of three different coating film samples showing the performance of each of the coating film samples when subjected to methyl ethyl ketone (MEK) double rubs testing as described in the Examples herein below.
Figure 3:
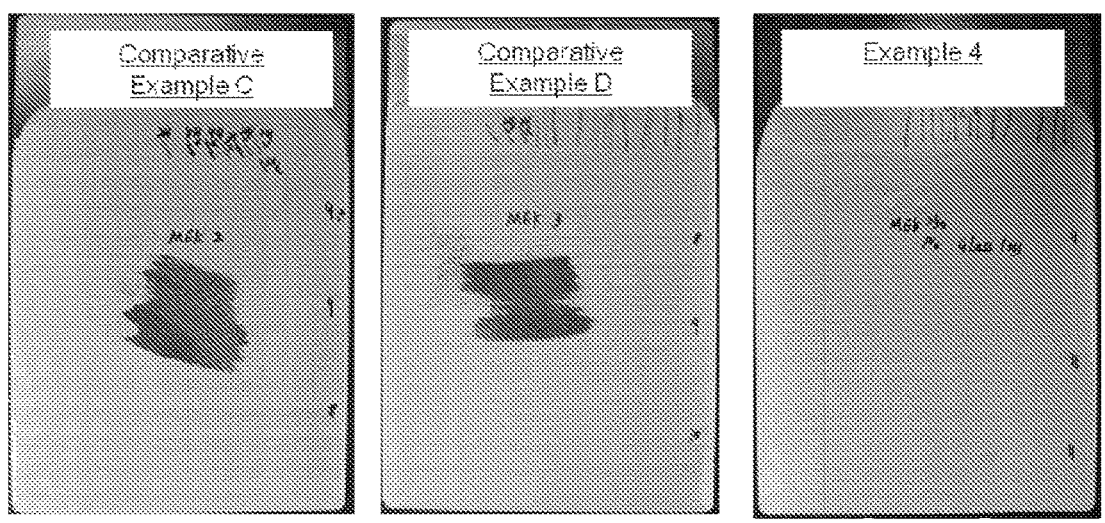
FIG. 3 is a photograph of the same three different coating film samples of FIG. 2 showing the performance of each of the coating film samples when subjected to adhesion testing as described in the Examples herein below.

With reference to FIG. 2, there is shown the solvent resistance performance of the coated films of Example 4, Comparative Example C, and Comparative Example D at various locations of the surface of the coated films. By visual observation, the coating film of Example 4 performs better, with regard to solvent resistance, than the coating films of Comparative Examples C and D.

In order to measure the adhesion to PU, a topcoat of PU material was applied on the top of each of the coated films of Example 4, Comparative Example C, and Comparative Example D. After the topcoat was cured at room temperature (about 25° C.) for a period of 1 day, the cross hatch adhesion test described above was performed on the PU topcoats. With reference to FIG. 2, there is shown the adhesion performance of the coated films of Example 4, Comparative Example C, and Comparative Example D at various locations of the surface of the coated films. By visual observation and based on the rating scale of "0B" to "5B" for adhesion, where "5B" is good adhesion and "0B" is bad adhesion, the coating of Example 4 has better adhesion to PU compared to the adhesion of the coatings of Comparative Examples C and D.

TABLE V

Coating Performance Results

| Test | Comparative Example C | Comparative Example D | Example 4 |
|---|---|---|---|
| Initial Viscosity, mPa-s | 1,100 | 1,760 | 500 |
| Dry film thickness (DFT), μm | 18 | 16 | 23 |
| T-Bend Flexibility | 1T | 0T | 0T |
| Pencil Hardness | 3H | 3H | 3H |
| Solvent Resistance(MEK), double rubs | 8 | 30 | >50 No Gloss loss |
| Adhesion to PU, rating | 0B | 0B | 5B |

The invention claimed is:

1. An advanced epoxy resin comprising a reaction product of
   (A) at least one epoxy resin;
   (B) at least one cashew nutshell liquid; and
   (C) at least one multifunctional carboxylic acid.

2. The advanced epoxy resin of claim 1, wherein the at least one epoxy resin, component (A), is a liquid epoxy resin derived from bisphenol A.

3. The advanced epoxy resin of claim 1, wherein the at least one cashew nutshell liquid, component (B), has a cardanol content greater than 85 weight percent.

4. The advanced epoxy resin of claim 1, wherein the at least one multifunctional carboxylic acid, component (C), is a dicarboxylic acid.

5. The advanced epoxy resin of claim 4, wherein the dicarboxylic acid is adipic acid.

6. The advanced epoxy resin of claim 1, wherein the molar ratio of the epoxy resin to the cashew nutshell liquid to the multifunctional carboxylic acid is in the range of from about 1:0.05:0.05 to about 1:1:0.5.

7. The advanced epoxy resin composition of claim 1, including further (D) a catalyst.

8. The advanced epoxy resin composition of claim 7, wherein the catalyst, component (D), is ethyl triphenyl phosphonium acetate.

9. The advanced epoxy resin composition of claim 1, wherein the reaction product formed comprises the following chemical structure:

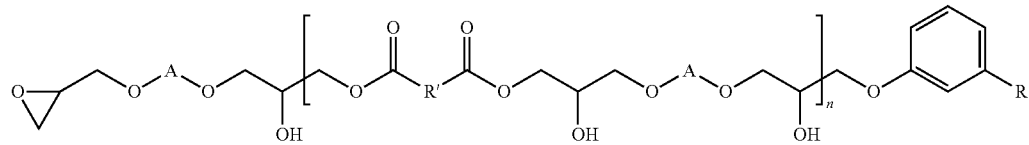

where n is 1 to 20; A is a moiety having from 2 to about 50 carbon atoms; R is a straight-chain alkyl with 15 carbons containing from 0 to 3 carbon-carbon double bond(s) (C≡C) and R' is a moiety having from 2 to about 34 carbon atoms.

10. The advanced epoxy resin composition of claim 9, wherein A is a divalent moiety selected from the group consisting of isopropylidenediphenylene, phenylene, biphenylene, —(CH$_2$)$_4$—, —(CH$_2$)$_6$—, —CH$_2$CH$_2$—, cyclohexane dimethylene, or combinations thereof.

11. The advanced epoxy resin composition of claim 9, wherein R is selected from the group consisting of —C$_{15}$H$_{31}$, —C$_{15}$H$_{29}$, —C$_{15}$H$_{27}$, and —C$_{15}$H$_{25}$.

12. The advanced epoxy resin composition of claim 9, wherein R' is a bivalent group having an aliphatic (—(CH$_2$)$_x$—) structure, wherein x can be 2 to 34, a polyoxyalkylene structure, cycloaliphatic structure, or an aromatic polycyclic structure.

13. A curable epoxy resin composition comprising a mixture of:
(I) an advanced epoxy resin of claim 1,
(II) a hardener; and
(III) optionally, a curing catalyst; wherein the curable epoxy resin composition has a volatile organic compound concentration of less than about 420 g/L.

14. The curable composition of claim 13, wherein the hardener is methylated hexamethoxymethylolmelamine.

15. The curable composition of claim 13, wherein the concentration of the advanced epoxy resin is from about 30 weight percent to about 60 weight percent based on the weight of all components in the curable epoxy resin composition.

16. The curable composition of claim 13, wherein the concentration of the hardener is from about 5 weight percent to about 30 weight percent.

17. The curable epoxy resin composition of claim 13, including further a curing catalyst; and wherein the curing catalyst is p-toluene sulphuric acid.

18. The curable composition of claim 13, including further a pigment.

19. A cured thermoset article prepared from the composition of claim 13.

20. A process for preparing a curable epoxy resin composition comprising admixing: (I) an advanced epoxy resin of claim 1, and (II) a hardener.

21. The advanced epoxy resin of claim 1, wherein the composition has a viscosity of from about 20,000 mPa-s to about 60,000 mPa-s.

22. The advanced epoxy resin of claim 1, wherein the composition has a decomposition temperature (Td) of from about 300° C. to about 350° C.

* * * * *